Figure 1:
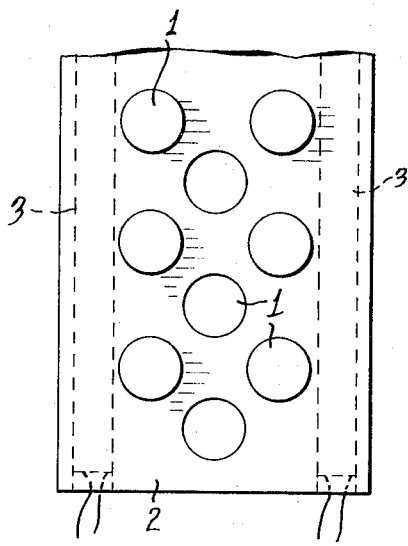

Feb. 7, 1967     H. SCHWANEKAMP ETAL     3,303,084
APPARATUS FOR WELDING SYNTHETIC PLASTIC FILMS AT SPACED POINTS
Filed July 25, 1963     3 Sheets-Sheet 1

*INVENTORS*
HUBERT SCHWANEKAMP
GEORG TRZECIAK
BY
ATTORNEY

Feb. 7, 1967

H. SCHWANEKAMP ETAL 3,303,084

APPARATUS FOR WELDING SYNTHETIC PLASTIC FILMS AT SPACED POINTS

Filed July 25, 1963

INVENTORS
HUBERT SCHWANEKAMP
GEORG TRZECIAK
BY
*James E. Bryan*
ATTORNEY

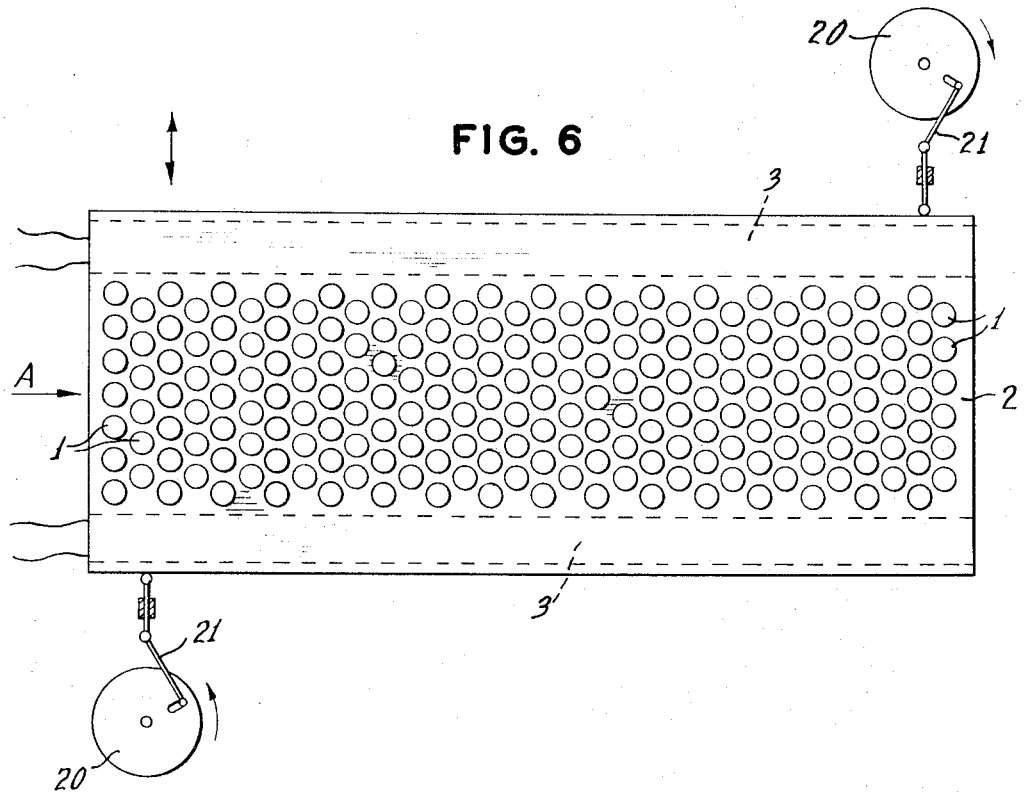
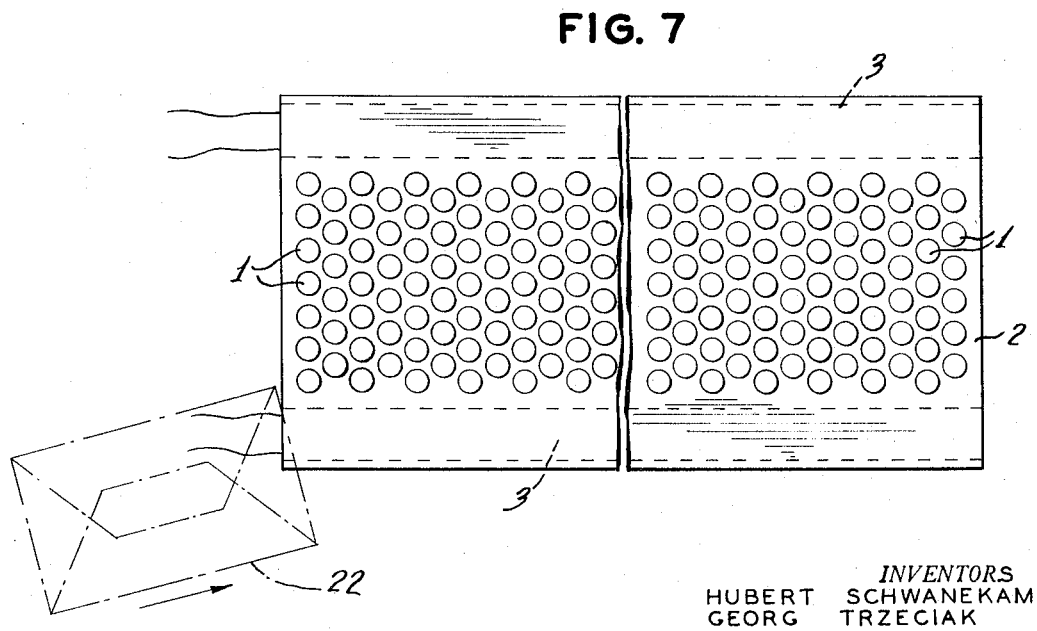

United States Patent Office 3,303,084
Patented Feb. 7, 1967

3,303,084
APPARATUS FOR WELDING SYNTHETIC PLASTIC FILMS AT SPACED POINTS
Hubert Schwanekamp, Bielefeld, and Georg Trzeciak, Wiesbaden, Germany, assignors to Kalle Aktiengesellschaft, Wiesbaden-Biebrich, Germany
Filed July 25, 1963, Ser. No. 297,555
Claims priority, application Germany, July 28, 1962, K 47,372
6 Claims. (Cl. 156—553)

This invention relates to a method of and apparatus for welding synthetic plastic films.

Films having a surface of a thermoplastic material can be bonded together by welding. It is sometimes customary to call this process of bonding films "welding" when the films concerned consist entirely of thermoplastic material, whereas in the case of films that are really laminates of a ply of non-weldable material and one or two external plies of thermoplastic material, this type of bonding is referred to as "heat-sealing" of the films. In the present case, however, "welding" describes the bonding of films having a weldable surface, irrespective of whether the films in their entirety or only an external surface or surfaces thereof consist of thermoplastic material.

In the production of wrappings from films having a weldable thermoplastic surface, the desired bonds between the plies are often produced by compressing the plies between two welding elements heated to a suitably high temperature, or between one heated welding element and a support, until the welded bond has been obtained. In such cases, the support is often constituted by the wrapped article itself. When welding films together by means of welding elements, it often proves difficult to produce bonds by welding in one operation in a manner such that the resulting bonds are equally satisfactory in all areas. This difficulty may arise when the support is of uneven shape or when it offers an uneven resistance to the welding element exerting the welding pressure, so that the pressure exerted on the films between the welding element and the support is not equal in all areas. Furthermore, an unequal strength of the welded bond often results when the welding operation is used to laminate a varying number of layers of films. The latter is the case, for example, when a box-shaped or block bottom of a bag is welded together after a cut film blank is folded.

In accordance with the present invention, the disadvantages referred to above can be overcome when the welded surface produced is composed of a large number of smaller separately welded surfaces. The method of welding plastic films into a welded surface by compression between a welding element, heated above the welding temperature, and a support comprises the steps of producing a welded surface composed of a large number of relatively small separately welded surfaces, by means of a plurality of separate elements, and compressing the separately welded surfaces between the separate elements and the support by pressures which may be variable. The independence of the value of the welding pressures at the separately welded surfaces is most easily achieved by individual spring-loading of the separate elements.

In the present method it is, moreover, often of advantage to produce the separate welds at different times. Such a manner of working is recommended when the film material tends to stick to the welding tool. In such a case, by providing for a time sequence in the action of adjacent welding elements, sticking can be prevented. The difference in time in exerting the individual welding pressures is also of advantage when the films develop little cohesive force immediately after the welding pressure is withdrawn so that the weld bond may easily tear during the solidification period of the material at the weld. The sequence of recently welded, pressure-relieved surfaces and surfaces still under welding pressure prevent such tearing. Although a large number of separately welded surfaces preferably make up the composite welding pattern, advantages of the method also occur when the composite welding surface comprises only a relatively small number of separately welded surfaces. The advantages afforded by the present method when the separately welded surfaces are produced in succession are achieved when, by means of at least one of the component welding elements, the corresponding separately welded surface is produced at a time different from the time of production of other welded surfaces produced with other component welding elements. The component welding elements may be arranged to produce the separately welded surfaces at two or more different times.

In one variation of the present method, a welded surface is produced in which the separately welded surfaces follow in succession without, or substantially without, any gap between them.

According to another variation of the present method, a welded surface is produced in which there are unwelded spaces between the component welded surfaces. In many cases this does not constitute a disadvantage. When, however, it is desired to obtain a continuous welded surface by this method, two or more welded surfaces consisting of a plurality of separately welded surfaces are produced with an overlap. The welded surfaces may be produced with two or more different welding elements, and there is no particular difficulty in producing the discontinuous welded surfaces with such an overlap that the final result is one continuous welded surface. Alternatively, in the present method a continuous welded surface can be produced with one welding element by displacing the film with respect to the welding element between separate welds. Also in this case it is not difficult to arrange the component elements making up the welding element, and to displace the films to be welded, in a manner such that the gaps left unwelded between the component welded surfaces in the production of the first welded surface are joined together by means of a further welded surface.

The present invention further provides an apparatus for welding plastic films, comprising one or more than one welding element, for carrying out the method of this invention. This welding apparatus comprises at least one welding element made up of a plurality of component welding elements which can be moved singly or in groups perpendicularly to the welding surface. This welding apparatus may have a variety of forms.

Figure 3:
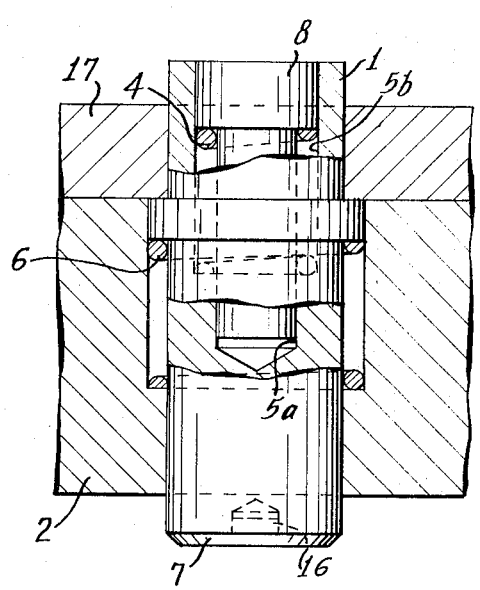
Figure 2:
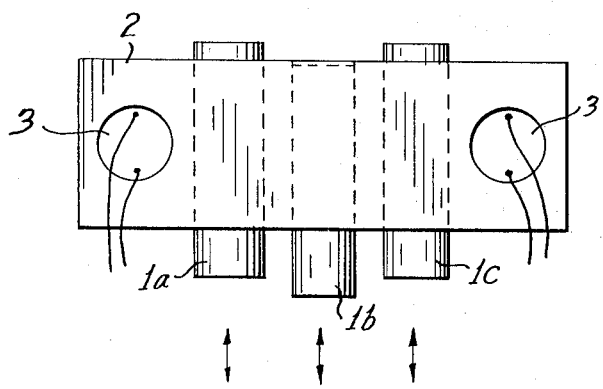
Figure 4:
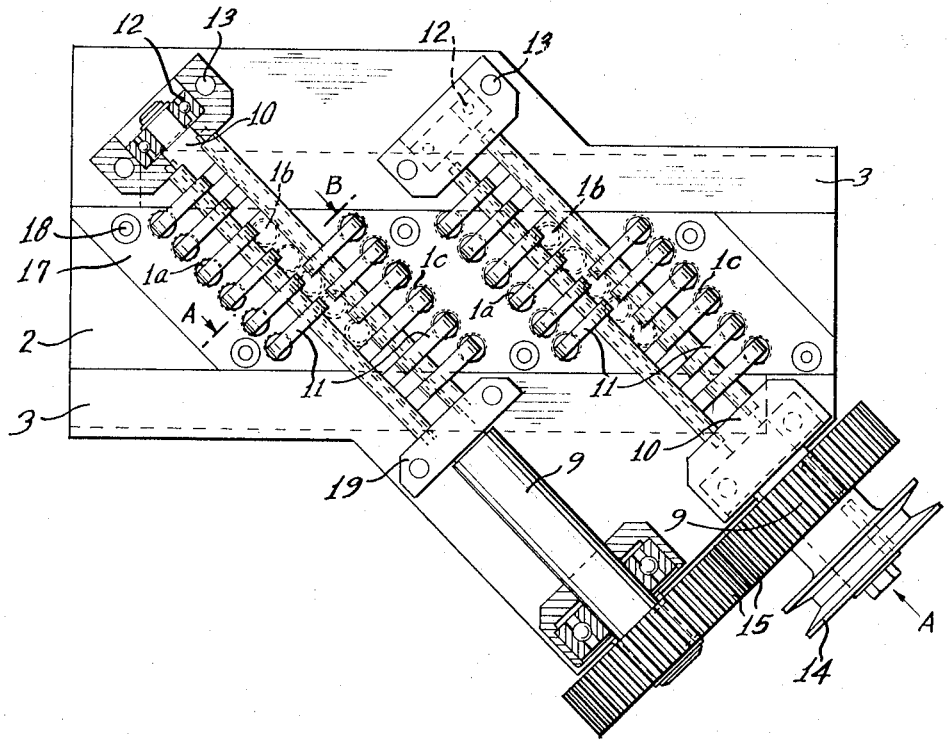
Figure 5:
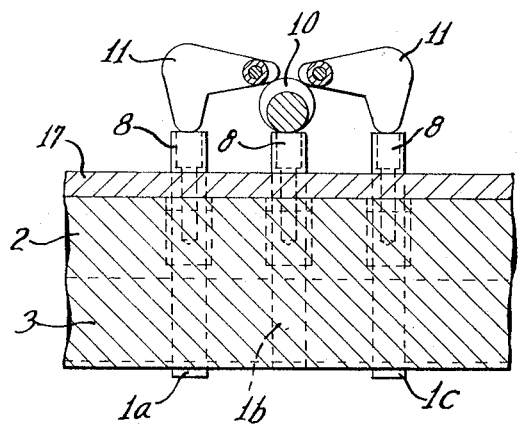

The invention is further illustrated in the accompanying drawings, in which:

FIGURE 1 is a plan view of one arrangement of the component elements of a welding means, FIGURE 2 is an end view in elevation diargammatically showing one disposition of the component elements, FIGURE 3 is a sectional view in elevation of one design of a component welding element, FIGURE 4 is a plan view, partly in section, of a complete welding element, FIGURE 5 is a sectional view taken on line A–B of FIGURE 4, FIGURE 6 is a plan view of an arrangement of a complete welding element, and FIGURE 7 is a diagrammatic plan view illustrating the way in which an article to be welded is conveyed past a welding element such as that of FIGURE 6.

Referring to the drawings, the movable component welding elements 1 may be positioned in a close sequence without gaps. In such a case, if necessary, sliding on one another may be facilitated by using a lubricant, for example graphite of molybdenum sulfide. In many cases, however, there are gaps between them. The movable component welding elements 1 are accommodated, for example, in an element block 2 containing electrical heating means 3 for supplying heat to the block for transfer to the component welding elements. The component welding elements are preferably arranged in rows which are advantageously staggered so that the component elements of one row are adjacent the gaps between the component elements of the succeeding row. FIGURE 1 represents such an arrangement of the component welding elements in staggered rows.

To cause the component elements 1 to reciprocate perpendicularly to the welding surface in a predetermined cycle during the welding operation, control members are provided to produce such a reciprocating movement, as described in detail below. In most cases, the reciprocating movement of the component elements is so controlled that one component element, or one row of component elements, exerts welding pressure, while the contiguous component element or contiguous row of elements does not exert welding pressure, and vice versa. By providing such an alternating cycle, the result is obtained that during the welding operation, in the material to be welded, zones of flowable film material coexist with zones of solidified film material, so that the cohesion and stability of the welded film surfaces are preserved. FIGURE 2 illustrates in a diagrammatic manner such an alternating cycle of the component elements. While the component element 1b in the middle row is moved downwardly within the element block 2 to exert the welding pressure, the component elements 1a and 1c of the two adjacent rows are moving upwardly, away from the film surface to be welded. A short time later the directions of these movements are reversed: the component elements 1a and 1c move downwardly, whereas the component element 1b moves upwardly.

The component elements are advantageously mounted in the element block in a resilient manner to ensure that the pressure they exert can not exceed a certain value. This resilience can be achieved, for example, by means of a spring 4 (FIGURE 3) which, when the desired maximum welding pressure is exceeded, is compressed and thus absorbs the excess pressure exerted by the control member of the component element 1. The component element 1 shown in FIGURE 3 has a bore 5a, 5b in which the control member, for example the plunger 8, is inserted. The plunger 8 can reciprocate in the bore 5b; its purpose is to depress the component element so that it protrudes a certain distance from the element block 2 when welding pressure is to be exerted. Another spring 6 retracts the component element 1 into the element block when the control member is moved upwardly, thereby relieving the welding pressure.

Resilient mounting of the component elements 1 in the block 2 is also of advantage in welding apparatus in which welding pressure is exerted by moving the element block as a whole towards the object to be welded so that all component elements in the block exert a welding pressure simultaneously and no control members are provided in the element block for effecting individual movement of the component elements.

Another advantage can be obtained by heating the component elements at different temperatures so that elements heated to a welding temperature are contiguous to those not heated to such a temperature. Such differential heating of the component elements can be achieved, for example, by one or more of the means described below: (1) The heating elements 3 may be disposed at different distances from the component elements so that the components closer to the heating means are heated to higher temperatures than those further away. (2)

The component elements may be made from materials having different thermal conductivities so that more heat is absorbed by those having a greater thermal conductivity and which are, therefore, heated to higher temperatures than those made from material of a lesser thermal conductivity. (3) The heating means may be inserted in bores in the element block, the bores being lined with materials of different thermal conductivity.

When welding films which tend to stick to the component elements during the welding operation, the elements may be provided with a coating 7 which prevents the elements from sticking to the films. The coating may consist, for example, of polytetrafluoroethylene or vaporized silica or a sintered metal. The coating may be, for example, a molding pressed by means of a plug 16 into the component element.

When welding elements consisting of spaced component elements are used, there is at first produced a welding pattern made up of discontinuous component welded surfaces. As mentioned above, a large continuous welded surface can be produced with the component elements by moving the object to be welded and the welding element relative to each other in the welding direct and applying welding pressure repeatedly. Such relative movements can be achieved, for example, by reciprocating the element block 2 parallel to the welding plane. As shown in FIGURE 6, this can be achieved by means of the crank discs 20 which, while revolving, cause the element block 2 to reciprocate through the medium of the crank links 21.

Another method of producing large continuous welded surfaces with welding elements consisting of a plurality of component elements is shown in FIGURE 7 where the object to be welded, in this case the block bottom of a bag, is conveyed in the welding plane past the welding element, during which the latter repeatedly exerts a welding pressure. The transport of the object past the welding element is advantageously performed obliquely with respect to the rows of the component elements 1.

A controlled reciprocation of the component elements can be achieved, for example, by the arrangement shown in FIGURES 4 and 5. The element block 2, provided with the heating means 3, has bores for six rows of component elements, in two groups of three, each group being controlled by a portion of a separate shaft 9 in the form of a cam shaft 10. Each group consists of two outer rows of six component elements 1a and 1c each and of an inner row of five component elements 1b, each. The plungers 8, referred to above, are inserted into the component elements to transmit control movement to the component elements. The plungers 8 of the middle row are depressed directly by the cam shaft 10, whereas in the case of the plungers 8 of the two outer rows, movement is transmitted by the cam shaft 10 through the rocker arms 11. As described above, the upward movement of the plungers 8 is caused by the return spring 6. When the cam shaft 10 is rotated, for example in the clockwise direction as shown in FIGURE 5, the component elements are successively depressed, for example beginning with the component elements 1b, followed by the component elements 1a and then finally by the component elements 1c. Thus, the movements of the rows of component elements occur consecutively. By varying the positions of the cams on the cam shaft 10, it is also possible to cause the component elements of a single row to move consecutively. While one component element executes an upward movement, in the manner described, contiguous component elements may perform a downward movement, whereby the latter exert a holding effect so that any sticking of the film to be welded to the rising component element can be prevented. This mode of operation is also of advantage when several film layers are to be welded together, because at the same time an accurately gauged welding pressure can be exerted by way of the spring 4 (FIGURE 3).

The shafts 9 rotate in the ball bearings 12 and 13 and in a sleeve bearing 19 and are driven through a pulley 14 by a motor, not shown, the rotation being synchronously transmitted from one shaft 9 to the other shaft 9 by the gears 15. The plungers 8 are guided in the component elements 1. The bearings 12, 13 and 19 are mounted on a base-plate 17 which is connected with the element block 2 by means of screws 18 or similar securing means.

With suitable modification, the welding apparatus described above may also be used on devices in which the work to be welded is conveyed through the device by a rotating work holder in a circular or arcuate track during which the welding operation is performed. When the circular track has a large radius, the component elements may have a planar disposition and be arranged to move perpendicularly to this plane, since their mobility enables them, within certain limits, to adapt themselves to the circular path of movement of the work. In many cases, however, it is better, and when the circular track along which the work moves is of a small radius it may be necessary, to dispose the component elements in the element block 2 radially with respect to the curved track along which the work is conveyed. In such a case the element block 2 may be of a correspondingly curved shape.

Other component welding elements may take the form of discs movable about their axes against radial spring-loading, the discs being contiguous or spaced and forming a rotatable roll-like welding element. Also suitable is a heating wire, coiled, to form a cylindrical spiral and mounted in a rotatable manner, and consisting of an elastic material, or, for example, a spiral of strong wire the major portion of which is located in a heating housing, and the spiral may be driven so as to operate simultaneously as a transporting means.

It will be obvious to those skilled in the art that many modifications may be made within the scope of the present invention without departing from the spirit thereof, and the invention includes all such modifications.

What is claimed is:

1. An apparatus for welding synthetic plastic film comprising a plurality of rows of welding elements, means for individually reciprocating groups of the elements in a direction substantially perpendicular to the welding surface, and means for moving the work to be welded past the elements in a direction oblique to the rows.

2. An apparatus according to claim 1 in which the elements are mounted in staggered rows.

3. An apparatus according to claim 1 in which the elements are reciprocated against the action of springs.

4. An apparatus according to claim 1 including means for actuating groups of the welding elements in succession.

5. An apparatus according to claim 1, in which the means for individually reciprocating groups of the elements includes a cam.

6. An apparatus according to claim 1, in which the elements comprise a plurality of plungers.

References Cited by the Examiner
UNITED STATES PATENTS

| | | | |
|---|---|---|---|
| 364,948 | 6/1887 | Moore | 100—237 |
| 1,395,530 | 11/1921 | Strane | 100—237 |
| 2,390,550 | 12/1945 | Moore | 156—583 |
| 2,422,525 | 6/1947 | Brown et al. | 156—290 |
| 2,545,243 | 3/1951 | Rumsey | 156—290 |
| 2,720,247 | 10/1955 | Richens | 156—290 |
| 2,730,161 | 1/1956 | Langer | 156—583 |
| 2,992,958 | 7/1961 | Yamaguchi | 156—290 |
| 2,999,042 | 9/1961 | Meister | 156—290 |
| 3,013,930 | 12/1961 | Serbin | 156—583 |
| 3,017,315 | 1/1962 | Doyle | 156—583 |

EARL M. BERGERT, *Primary Examiner.*
DOUGLAS J. DRUMMOND, *Examiner.*